(12) United States Patent
Nge et al.

(10) Patent No.: US 12,181,947 B2
(45) Date of Patent: Dec. 31, 2024

(54) PROCESSOR PEAK CURRENT CONTROL APPARATUS AND METHOD

(71) Applicant: Intel Corporation, Santa Clara, CA (US)

(72) Inventors: Chee Lim Nge, Beaverton, OR (US); Alexander Uan-Zo-li, Hillsboro, OR (US); Zhongsheng Wang, Portland, OR (US); James Hermerding, II, Vancouver, WA (US); Caren Magi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 951 days.

(21) Appl. No.: 17/030,175

(22) Filed: Sep. 23, 2020

(65) Prior Publication Data

US 2022/0091656 A1 Mar. 24, 2022

(51) Int. Cl.
  *G06F 1/3212* (2019.01)
  *G06F 1/32* (2019.01)
  *G06F 1/3234* (2019.01)

(52) U.S. Cl.
  CPC ............ *G06F 1/3212* (2013.01); *G06F 1/325* (2013.01)

(58) Field of Classification Search
  CPC .............................. G06F 1/3212; G06F 1/325
  See application file for complete search history.

(56) References Cited

U.S. PATENT DOCUMENTS

| | | | | |
|---|---|---|---|---|
| 2016/0306013 A1* | 10/2016 | Kondo | ............... | G01R 31/3835 |
| 2019/0041969 A1* | 2/2019 | Nge | ...................... | G06F 9/4893 |
| 2019/0227612 A1* | 7/2019 | Nge | ...................... | G06F 1/3234 |
| 2020/0264692 A1* | 8/2020 | Gorbatov | .............. | G06F 1/3296 |

FOREIGN PATENT DOCUMENTS

| | | | | |
|---|---|---|---|---|
| WO | WO-2012175144 A1 * | 12/2012 | .......... | G06F 1/3203 |
| WO | WO-2019117961 A1 * | 6/2019 | ............... | G06F 1/26 |

* cited by examiner

*Primary Examiner* — Mark A Connolly
(74) *Attorney, Agent, or Firm* — NICHOLSON DE VOS WEBSTER & ELLIOTT LLP

(57) ABSTRACT

A driver (e.g., a firmware or software) that improves the performance of the system-on-chip (SoC) in battery mode. The driver is a Peak Power Manager (PPM) which allows drastically higher SoC peak power limit levels (and thus higher Turbo performance) in battery mode. The PPM sets the Vth threshold voltage (the voltage level at which the platform will throttle the SoC) in such a way as to prevent the system from unexpected shutdown (or black screening). The PPM calculates the Psoc,pk SoC Peak Power Limit (e.g., PL4), according to the threshold voltage (Vth). These are two dependent parameters, if one is set, the other can be calculated. The scheme by the PPM is used to optimally set one parameter (Vth) based on the system parameters, and the history of the operation.

19 Claims, 4 Drawing Sheets

PROCESSOR PEAK CURRENT CONTROL APPARATUS AND METHOD

BACKGROUND

With each System-on-Chip (SoC) generation, the peak power for the SoC is increasing. The maximum power (Pmax) of an SoC is limited by the IR drop that causes the supply voltage at the SoC to fall below a minimum allowable threshold. Pmax sets the maximum frequency of the processor cores of the SoC and directly impacts the performance of the SoC. Varying platform level power state (e.g., PL4 state) using 2s batteries (and is batteries) based on the battery state of charge with the fuel gauge reporting the peak power for a given minimum system voltage, is challenging. It is further challenging to maintain performance of the SoC (or prevent a large decrease of it) in battery mode, when battery wear-out, temperature variation and state of charge are considered.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
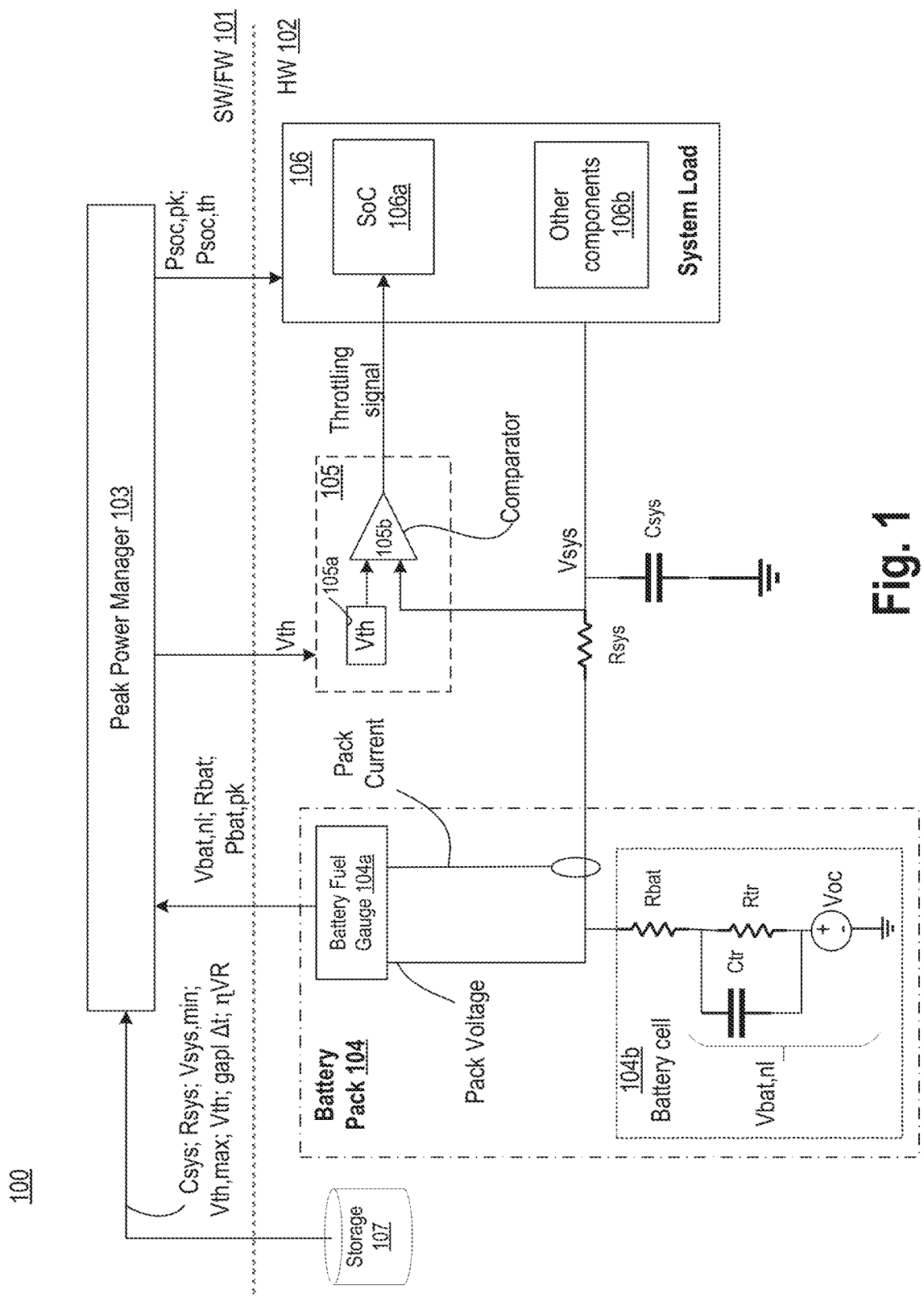
FIG. 1 illustrates a high-level architecture of a scheme to allow SoC peak power limit (Psoc,pk) to be above a battery sustained peak capability without violating system voltage (Vsys) minimum level (Vsys,min), in accordance with some embodiments.

Some embodiments describe a driver (e.g., a firmware or software) that improves the performance of the SoC in battery mode. The driver is a Peak Power Manager (PPM) which allows drastically higher SoC peak power limit levels (and thus higher Turbo performance) in battery mode, in accordance with some embodiments. In some embodiments, the driver implements power throttling and is part of Intel's Dynamic Tuning Technology (DTT). In various embodiments, the peak power limit is referred to PL4. However, the embodiments are applicable to other peak power limits.

In some embodiments, the Peak Power Manager sets the Vth threshold voltage (the voltage level at which the platform will throttle the SoC) in such a way as to prevent the system from unexpected shutdown (or black screening). In some embodiments, the Peak Power Manager calculates the Psoc,pk SoC Peak Power Limit (e.g., PL4), according to the threshold voltage (Vth). These are two dependent parameters, if one is set, the other can be calculated. The scheme of various embodiments is used to optimally set one parameter (Vth) based on the system parameters, and the history of the operation.

In some embodiments, a machine-readable storage media is provided which comprises machine-executable instructions that when executed cause one or more machines to perform a method comprising calculating a current threshold voltage as a function of battery no-load voltage, maximum threshold voltage, and a voltage gap between the battery no-load voltage and a previous threshold voltage. The method further comprises calculating a processor peak power limit as a system peak power limit which in turn is a function of the current threshold. The method further comprises sending the current threshold voltage to a threshold circuitry; and sending the processor peak power limit to the processor, wherein the current threshold sets a threshold voltage to trigger throttling of the processor to manage peak power of the processor. In some embodiments, the method of calculating a processor peak power limit comprises calculating a system peak power as a function of the current threshold voltage, battery no-load voltage, system power rail capacitance, time between system voltage drops below the current voltage threshold and the system reduces peak power, battery resistance, and a minimum voltage level of the system power rail. In some embodiments, the method of calculating the processor peak power limit comprises scaling a difference between the system peak power and power by rest of platform. In some embodiments, the method of scaling the difference comprises accounting for power conversion loss of a voltage regulator.

In some embodiments, the method further comprises comparing the processor peak power limit against a maximum power peak power limit; and setting the processor peak power limit to the maximum processor peak power limit if the processor peak power limit is greater than the maximum power peak power limit. In some embodiments, the method further comprises: comparing the processor peak power limit against a minimum power peak power limit; and setting the processor peak power limit to the minimum processor peak power limit if the processor peak power limit is less than the minimum power peak power limit. In some embodiments, the processor peak power limit is an upper limit of instantaneous peak power that can be provided by a battery and capacitors of a system power rail before the processor is throttled. In some embodiments, the method further comprises reading the battery no-load voltage from a fuel gauge of a battery, wherein the battery no-load voltage is a runtime variable. In some embodiments, the method further comprises lowering the current threshold voltage if it is determined that the processor is not throttling when the processor power limit crosses the peak power of the processor.

Today, the SoC is throttled to lowest operating frequency. Some embodiments provide a scheme to dynamically calculate the throttling level (Psoc,th) based on the available battery power (which changes slowly) and set the SoC throttling peak power (Psoc,th). In some embodiments, a Power Management Unit firmware (FW) of the SoC decides the frequencies and voltages based on Psoc,th as provided by the Peak Power Manager. In this case, throttling events have less negative effect on the SoC performance Today none of the SoCs allow the total peak power of a system to exceed a battery peak power capability without running the risk of black screening. Various embodiments provide a scheme which allows Pmax framework to operate. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g. immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates a high-level architecture 100 of a scheme to allow SoC peak power limit (Psoc,pk) to be above a battery sustained peak capability without violating system voltage (Vsys) minimum level (Vsys,min), in accordance with some embodiments. Architecture 100 comprises software (SW) or firmware (FW) 101 and hardware (HW) 102 components. In various embodiments FW 101 comprises Peak Power Manager (PPM) 103 which manages peak power performance of system load 106. In this simplified architecture, HW 102 comprises battery pack 104, threshold circuitry 105, system load 106, storage 107, system resistance Rsys, and system capacitance Csys. In some embodiments, battery pack 104 comprises battery fuel gauge 104a and one or more battery cells 104b. Here, the one or more battery cells are modeled as a Thevenin equivalent circuit having battery resistance Rbat, voltage source Voc, and RC circuit comprising resistor Rtr and capacitor Ctr. Threshold circuitry 105 comprises register 105a (or non-volatile memory) to store threshold Vth and comparator 105b. System load 106 comprises SoC 106a (e.g., SoC of FIG. 4) and other system components 106b. Storage 107 can be a hard disk, non-volatile memory, or volatile memory.

In some embodiments, battery fuel gauge 104a reports the battery no-load voltage (Vbat,nl) and Rbat (pack-side impedance on the battery path) to PPM 103. In some embodiments, battery fuel gauge 104a measures the voltage and current of battery pack 104 to estimate the runtime values of Rbat and Vbat,nl. Note that fuel gauge 104a reports parameters of first order Thevenin equivalent model of battery cell 104b. Here, Vbat,nl is battery instantaneous voltage when there is no load and Rbat is the Ohmic resistance of cell 104b and components along the battery path such as isolation MOSFET. In some example, polarization RC circuits Rtr and Ctr that represent the transient behavior are not reported by fuel gauge 104a because they may not be used by the calculations made by Peak Power Manager 103.

In some embodiments, Peak Power Manager 103 is software that calculates the Psoc,pk (SoC peak power limit) and the Vth (threshold voltage for triggering throttling signal). If the Vsys (system voltage) droops below Vth (due to high power drawn by the system load), comparator 105b (in the Throttling hardware circuitry 105) asserts Throttling signal to reduce the peak power of the SoC.

In some embodiments, storage device 107 provides system dependent parameters such as, but not limited to, Csys (total capacitance at the system rail); Rsys (battery path impedance on the system side i.e. non-pack resistance); Vsys, min (system rail minimum voltage); Vth,max (maximum level of threshold voltage for triggering throttling signal); Prop (rest-of-platform peak power); Vth,gap (delta between Vbat,nl and Vth); Δt (the time between the system voltage drops below Vth and the SoC reduces peak power due to Throttling Signal assertion); and ηVR (a voltage regulator VR power conversion loss).

In various embodiments, PPM 103 selects and provides Psoc,pk (the SoC peak power limit) and Vth (threshold voltage for triggering throttling signal) to HW 102. A higher Psoc,pk level would mean a higher Vth level, and vice versa. A higher Vth level means a higher threshold to trigger throttling. In some embodiments, Peak Power Manager 103 comprises an algorithm that uses parameter, Vth,gap which is used to set the delta (difference) between Vbat,nl (the battery no-load voltage) and Vth (the threshold voltage for the triggering throttling signal of the SoC). PPM 103 allows a system designer to tune one parameter (e.g., Vth,gap) to optimize performance for different battery states of charge and different applications and benchmarks.

In some embodiments, Vth,gap could also be further tuned automatically by Peak Power Manager 103 or other SW driver based on the number of throttling events. For example, if SoC 106a is never throttling, it is a clear indication that Vth,gap was set too high, and Vth,gap could be set lower—and this may be a result of either a low application ratio, RoP (rest of the platform or other system components) 106b consuming low power or some system parameters being better than initially expected.

Consider that the SoC Peak Power Limit value Psoc,pk is constrained by an upper limit of Vth setting, which is given as:

$$V_{th} = \min(V_{th,max}, V_{bat,nl} - V_{th,gap}) \quad \text{(Eq. 1)}$$

where Vth,max is the largest Vth value that can be set by the platform throttling circuitry 105, Vbat,nl is the battery instantaneous no load voltage, Vth,gap is the voltage margin between Vth and Vbat,nl, In some embodiments, Vth,max is a static variable provided by storage 107. In other embodiments, Vth,max is a programmable variable provided by storage 107. In some embodiments, Vbat,nl is a runtime variable provided by platform battery fuel gauge 104a. In some embodiments, Vth,gap is a static variable provided by storage 107. In some embodiments, Vth,gap may be overridden in runtime for performance optimization. In some embodiments, Vth,gap is a programmable variable.

For the given upper limit of Vth setting, PPM 103 determines the upper limit of system instantaneous peak power Psys,pk that can be provided by the battery and the system rail capacitors before Throttling Signal assertion. In some embodiments, PPM 103 determines Psys,pk as:

$$P_{sys,pk} = (V_{th} + V_{sys,min}) \quad \text{(Eq. 2)}$$

$$\left[ \frac{\Delta t(2V_{bat,nl} - V_{th} - V_{sys,min}) + 2R_{bat}C_{sys}(V_{th} - V_{sys,min})}{4R_{bat}\Delta t} \right]$$

Where, Vth is the setting as given in Eq. 1; Vsys,min is the minimum voltage level of the system rail; Δt is the time between the system voltage drops below Vth and the SoC reduces peak power (due to Throttling Signal assertion), Csys is the total capacitances on the system rail, Rbat is the battery ohmic resistance. In some embodiments, Vsys,min is a static or programmable variable provided by storage 107. In some embodiments, Δt is a static or programmable variable provided by storage 107. In some embodiments, Csys is a static or programmable variable provided by storage 107. In some embodiments, Rbat is a runtime variable provided by platform fuel gauge 104a.

In some embodiments, PPM 103 determines SoC peak power limit Psoc,pk (the value written to the SoC through HW/SW interface) by subtracting the rest-of-platform power from the system power $$P_{soc,pk} = \eta_{VR}(P_{sys,pk} - P_{rop}) \quad \text{(Eq. 3)}$$

where Psys,pk is the upper limit of instantaneous peak power that can be provided by battery 104 and the system rail capacitors before Throttling Signal assertion as given in Eq. 2, Prop is the rest-of-platform power, and ηVR is a scaling factor (typically used to account for voltage regulator VR power conversion loss). In some embodiments, Prop is a static or programmable variable provided by the storage. In some embodiments, ηVR is a static or programmable variable provided by the storage In some embodiments, once the Psoc,pk value is calculated using Eq. 3, Peak Power Manager 103 compares and clips Psoc,pk value to the upper bound value Psoc,pk,max and lower bound value Psoc,pk,min. If the Psoc,pk value is clipped to the limits (Psoc,pk,max and Psoc,pk,min) the Vth value may be recalculated. In some embodiments, Psys,pk, the instantaneous peak power is re-evaluated, where Psys,pk can be provided by battery 104 and the system rail capacitors Csys before Fast PROCHOT# assertion using:

$$P_{sys,pk} = P_{soc,pk}/\eta_{VR} + P_{rop} \quad \text{(Eq. 4)}$$

where Psoc,pk is SoC peak power limit clipped to the limits (Psoc,pk,max and Psoc,pk,min); ηVR is a scaling factor (typically used to account for voltage regulator VR power conversion loss), a static or programmable variable provided by storage 107.

Using the system peak power Psys,pk, we can obtain the Vth setting $$V_{th} = \frac{\sqrt[2]{\left(R_{bat}C_{sys}V_{sys,min} - \frac{1}{2}V_{bat,nl}\Delta t\right)^2 +} - }{2R_{bat}C_{sys} - \Delta t}$$ (Eq. 5)

where, Psys,pk is the upper limit of instantaneous peak power that can be provided by the battery and the system rail capacitors Csys before Throttling Signal assertion as given in Eq. 4.

Figure 2A:
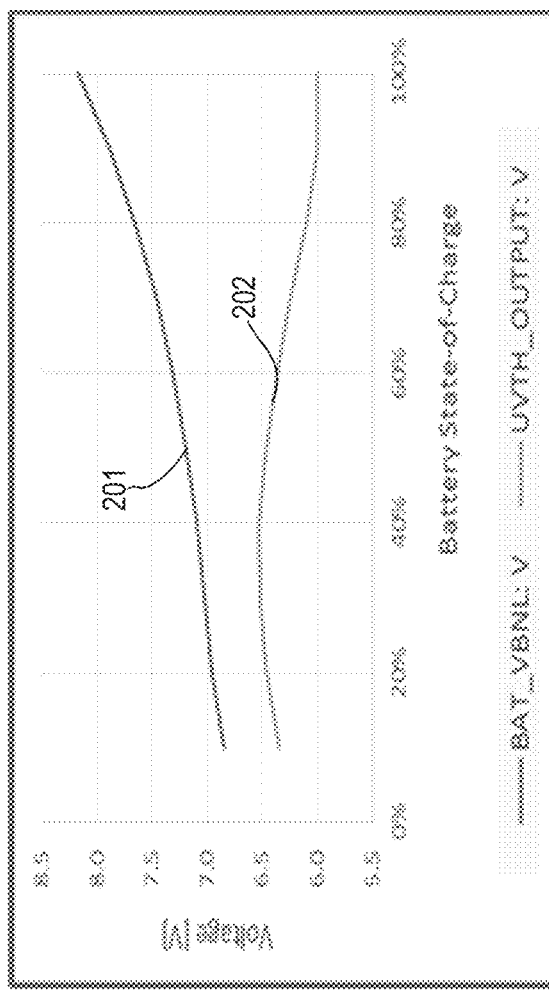
FIG. 2A illustrates a plot showing battery with no load voltage and the charger threshold voltage as a function of state of charge of the battery, in accordance with some embodiments.

FIG. 2A illustrates plot 200 showing battery with no load voltage (curve 201) and the charger threshold voltage (curve 202) as a function of state of charge of battery 104, in accordance with some embodiments. In this example, the minimum difference between the battery no load voltage and the threshold voltage is 0.5V.

Figure 2B:
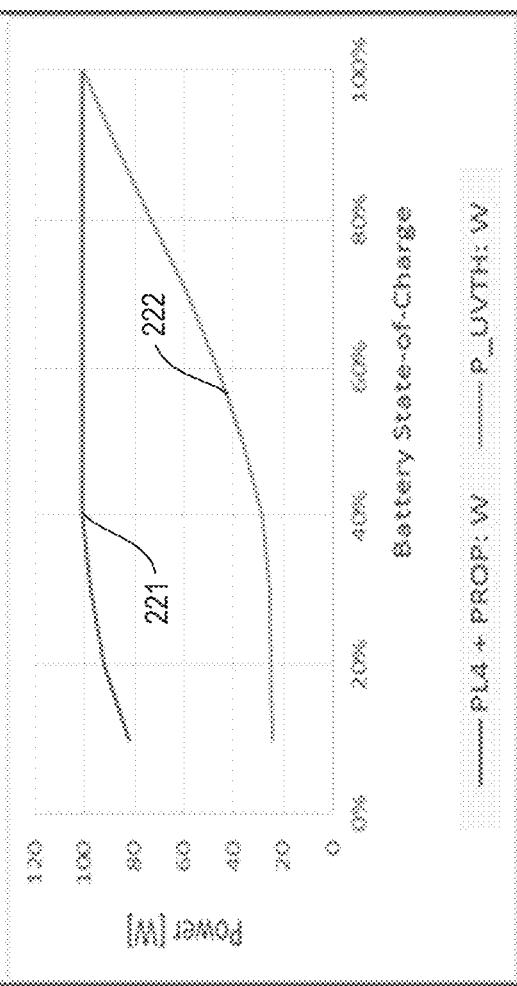
FIG. 2B illustrates a plot showing total battery peak power allowable by the scheme, and the power level at which the charger will throttle, in accordance with some embodiments.
Figure 3:
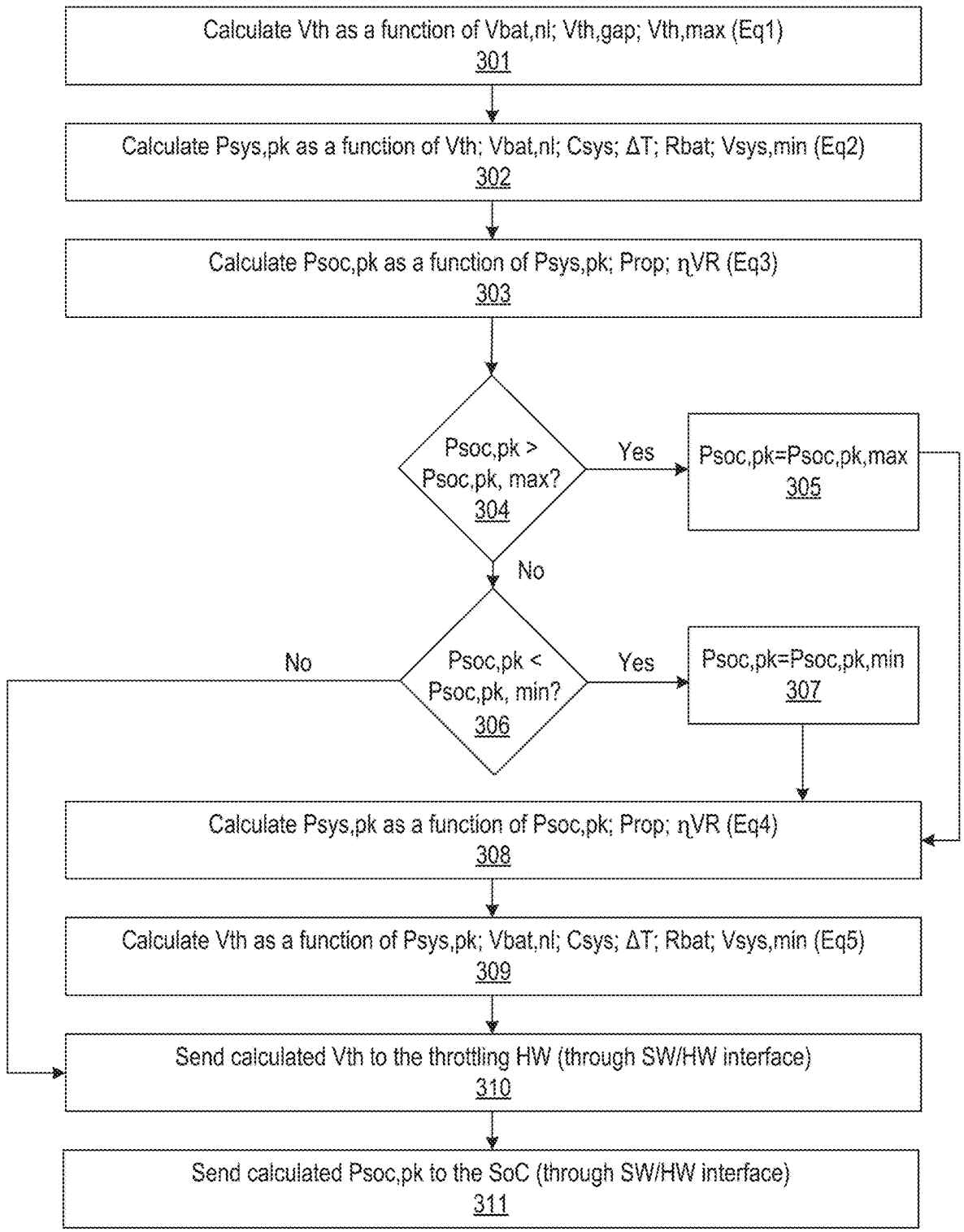
FIG. 3 illustrates a flowchart of a method to allow SoC peak power limit (Psoc,pk) to be above a battery sustained peak capability without violating system voltage (Vsys) minimum level (Vsys,min), in accordance with some embodiments.

FIG. 2B illustrates plot 220 showing total battery peak power (curve 221) allowable by the scheme, and the power level at which the charger will throttle (curve 222), in accordance with some embodiments. Here, until about 40% state of charge, the CPU will be a full performance In various embodiments, the voltage delta between the no load battery voltage and the threshold voltage is dynamically adjusted based on the number of throttling events. As such, when at lower state of charge when a CPU may be throttled FIG. 3 illustrates flowchart 300 of a method to allow SoC peak power limit (Psoc,pk) to be above a battery sustained peak capability without violating system voltage (Vsys) minimum level (Vsys,min), in accordance with some embodiments. While various blocks are illustrated in a particular order, the order can be modified. For example, in some embodiments some blocks may be performed before others while some blocks may be performed in parallel or simultaneously. In various embodiments, the blocks illustrated here are performed by PPM 103. For example, machine-readable instructions are provided that when executed by a processor (e.g., a SoC) cause the PPM 103 to perform the method of flowchart 300. The details of the operations are described with reference to FIG. 1.

At block 301, equation 1 is computed to determine Vth as a function Vbat,nl, Vth,gap, and Vth,max. At block 302, equation 2 is computed to calculated Psys,pk as a function of Vth; Vbat,nl; Csys; delta T (Δt); Rbatl Vsys,min. At block 303, equation 3 is computed to calculate Psoc,pk as a function of Psys,pk; Prop; and ηVR. At block 304, a determination is made about whether Psoc,pk is greater than Psoc,pk,max. If Psoc,pk is greater than Psoc,pk,max, the process proceeds to block 305 where Psoc,pk is set to Psoc,pk,max, and the process proceeds to block 308. If Psoc,pk is less than or equal to Psoc,pk,max, the process proceeds to block 306. At block 306, determination is made about whether Psoc,pk is less than Psoc,pk,min. If Psoc,pk is less than Psoc,pk,min, the process proceeds to block 307 where Psoc,pk is set to Psoc,pk,min, and the process proceeds to block 308. If Psoc,pk is less than or equal to Psoc,pk,max, the process proceeds to block 310.

At block 308, equation 4 is computed to calculate Psys,pk as a function of Psoc; Prop; and ηVR. At block 309, equation 5 is computed to calculate Vth as a function of Psys,pk; Vbat,nl; Csys; ΔT; Rbat; and Vsys,min. At block 310, PPM 103 sends the calculated Vth to throttling HW circuitry 105. At block 311, PPM 103 sends the calculated Psoc,pk to the SoC. A such, the system is prevented from unexpected shutdown (or black screening) by dynamically adjusting Vth and Psoc,pk.

Figure 4:
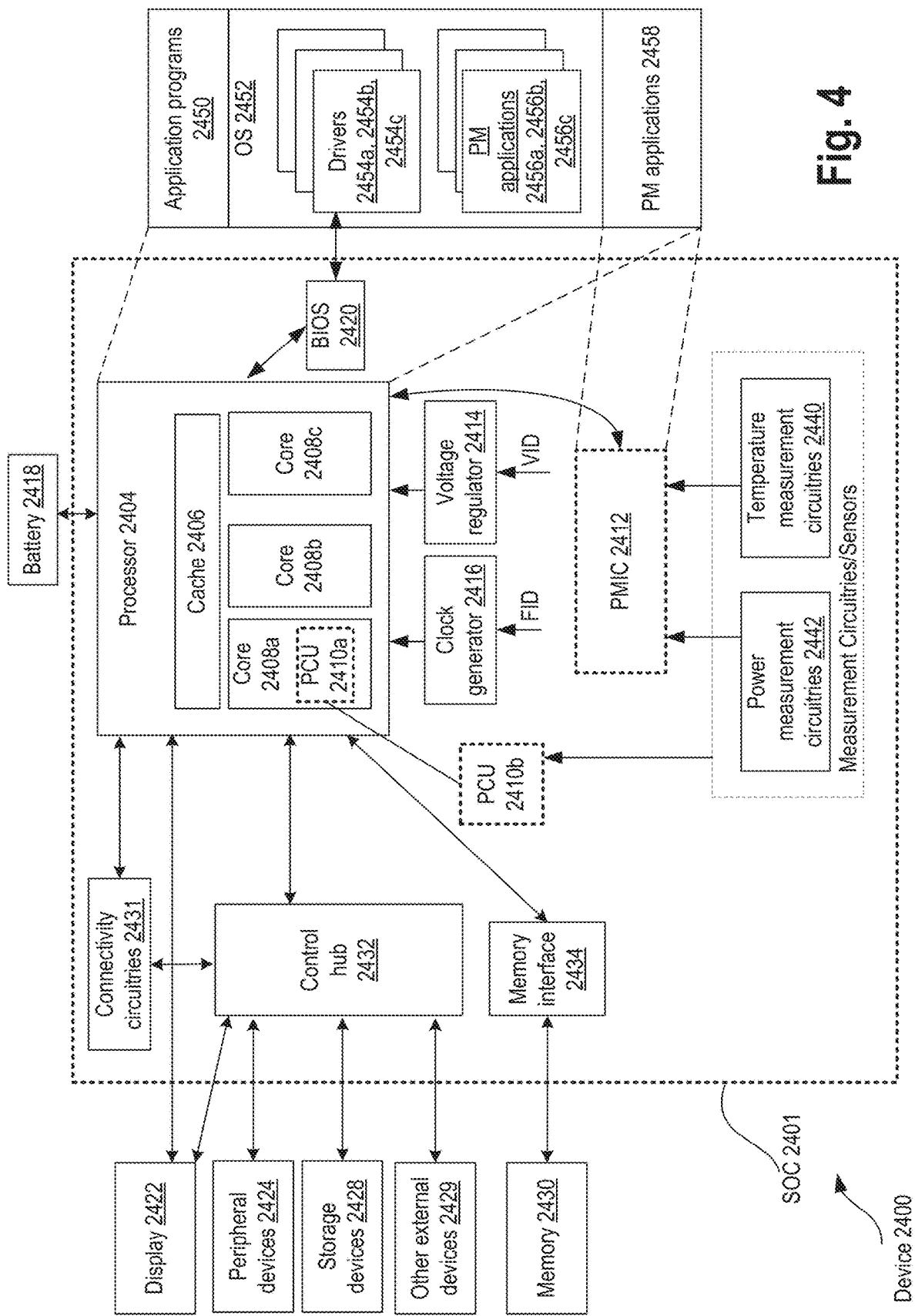
FIG. 4 illustrates a smart device or a computer system or a SoC (System-on-Chip) which executes a scheme to allow SoC peak power limit (Psoc,pk) to be above a battery sustained peak capability without violating system voltage (Vsys) minimum level (Vsys,min), in accordance with some embodiments.

FIG. 4 illustrates a smart device or a computer system or a SoC (System-on-Chip) which executes a scheme to allow SoC peak power limit (Psoc,pk) to be above a battery sustained peak capability without violating system voltage (Vsys) minimum level (Vsys,min), in accordance with some embodiments. In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises an SoC (System-on-Chip) 2401. An example boundary of the SoC 2401 is illustrated using dotted lines in FIG. 4, with some example components being illustrated to be included within SoC 2401—however, SoC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408a, 2408b, 2408c. Although merely three cores 2408a, 2408b, 2408c are illustrated in FIG. 4, processor 2404 may include any other appropriate number of processing cores, e.g., tens, or even hundreds of processing cores. Processor cores 2408a, 2408b, 2408c may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408a, a second section of cache 2406 dedicated to core 2408b, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 2404 may also include a bus unit to enable communication between components of processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, a cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device 2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments, and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400.

In some embodiments, memory 2430 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 2430 can be a dynamic random-access memory (DRAM) device, a static random-access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408a, 2408b, 2408c, voltage regulator 2414, memory 2430, a mother-board of SoC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SoC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 2410a/b and/or PMIC 2412. In some embodiments, each core has a network of distributed LDOs to provide efficient control for power management. The LDOs can be digital, analog, or a combination of digital or analog LDOs. In some embodiments, VR 2414 includes current tracking apparatus to measure current through power supply rail(s).

In some embodiments, VR 2414 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 2414 is completely eliminated (or substantially eliminated) and there is merely a single undershoot transition which could lead to a guaranteed Vmin based on a comparator delay and the di/dt of the load with the available output decoupling capacitance.

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter. In some embodiments, battery 2418 includes battery subsystem which comprises battery control and driver MOS (DrMOS) block.

In some embodiments, the charging circuitry (e.g., 2418) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410a. In an example, some other sections of PCU 2410 may be implemented outside the processing cores 2408, and these sections of PCU 2410 are symbolically illustrated using a dotted box and labelled as PCU 2410b. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor (s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456*a*, 2456*b*, 2456*c*. The OS 2452 may also include various drivers 2454*a*, 2454*b*, 2454*c*, etc., some of which may be specific for power management purposes. In some embodiments, device 2400 may further comprise a Basic Input/output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

In some embodiments, battery 2418 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, pCode executing on PCU 2410*a/b* has a capability to enable extra compute and telemetries resources for the runtime support of the pCode. Here pCode refers to a firmware executed by PCU 2410*a/b* to manage performance of the 2401. For example, pCode may set frequencies and appropriate voltages for the processor. Part of the pCode are accessible via OS 2452. In various embodiments, mechanisms and methods are provided that dynamically change an Energy Performance Preference (EPP) value based on workloads, user behavior, and/or system conditions. There may be a well-defined interface between OS 2452 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 2452 by including machine-learning support as part of OS 2452 and either tuning the EPP value that the OS hints to the hardware (e.g., various components of SoC 2401) by machine-learning prediction, or by delivering the machine-learning prediction to the pCode in a manner similar to that done by a Dynamic Tuning Technology (DTT) driver. In this model, OS 2452 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 2452 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery power (which changes slowly) and set the SoC throttling peak power (Psoc,th). In some embodiments, pCode decides the frequencies and voltages based on Psoc,th. In this case, throttling events have less negative effect on the SoC performance Various embodiments provide a scheme which allows maximum performance (Pmax) framework to operate.

In some embodiments, VR 2414 includes a current sensor to sense and/or measure current through a high-side switch of VR 2414. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: A machine-readable storage media comprising machine-executable instructions that when executed cause one or more machines to perform a method comprising: calculating a current threshold voltage as a function of battery no-load voltage, maximum threshold voltage, and a voltage gap between the battery no-load voltage and a previous threshold voltage; calculating a processor peak power limit as a system peak power limit which in turn is a function of the current threshold; sending the current threshold voltage to a threshold circuitry; and sending the processor peak power limit to the processor, wherein the current threshold sets a threshold voltage to trigger throttling of the processor to manage peak power of the processor.

Example 2: The machine-readable storage media of example 1, wherein calculating the processor peak power limit comprises: calculating a system peak power as a function of the current threshold voltage, battery no-load voltage, system power rail capacitance, time between system voltage drops below the current voltage threshold and the system reduces peak power, battery resistance, and a minimum voltage level of the system power rail.

Example 3: The machine-readable storage media of example 2, wherein calculating the processor peak power limit comprises: scaling a difference between the system peak power and power by rest of platform.

Example 4: The machine-readable storage media of example 3, wherein scaling the difference comprises accounting for power conversion loss of a voltage regulator.

Example 5: The machine-readable storage media of example 1 comprising machine-executable instructions that when executed cause the one or more machines to perform the method comprising: comparing the processor peak power limit against a maximum power peak power limit; and setting the processor peak power limit to the maximum processor peak power limit if the processor peak power limit is greater than the maximum power peak power limit.

Example 6: The machine-readable storage media of example 5 comprising machine-executable instructions that when executed cause the one or more machines to perform the method comprising: comparing the processor peak power limit against a minimum power peak power limit; and setting the processor peak power limit to the minimum processor peak power limit if the processor peak power limit is less than the minimum power peak power limit.

Example 7: The machine-readable storage media of example 1, wherein processor peak power limit is an upper limit of instantaneous peak power that can be provided by a battery and capacitors of a system power rail before the processor is throttled.

Example 8: The machine-readable storage media of example 1 comprising machine-executable instructions that when executed cause the one or more machines to perform the method comprising: reading the battery no-load voltage from a fuel gauge of a battery, wherein the battery no-load voltage is a runtime variable.

Example 9: The machine-readable storage media of example 1 comprising machine-executable instructions that when executed cause one or more machines to perform a method comprising: lowering the current threshold voltage if it is determined that the processor is not throttling when the processor power limit crosses the peak power of the processor.

Example 10: A system comprising: a system load comprising a system-on-chip; a battery having a fuel gauge to provide a battery no-load voltage; a threshold circuitry to throttle the system-on-chip according to a threshold; a memory to store a maximum threshold voltage, and a voltage gap between the battery no-load voltage and a previous threshold voltage; a power manager to: calculate a current threshold voltage as a function of the battery no-load voltage, the maximum threshold voltage, the voltage gap; calculate a processor peak power limit as a system peak power limit which in turn is a function of the current threshold; send the current threshold voltage to the threshold circuitry; and send the processor peak power limit to the system-on-chip, wherein the current threshold sets a threshold voltage to trigger throttling of the system load to manage peak power of the system load.

Example 11: The system of example 10, wherein the power manager is to calculate a system peak power as a function of the current threshold voltage, the battery no-load voltage, a system power rail capacitance, a time between system voltage drops below the current voltage threshold and the system reduces peak power, a battery resistance, and a minimum voltage level of the system power rail.

Example 12: The system of example 11, wherein the memory stores the system power rail capacitance, and the time between system voltage drops below the current voltage threshold and the system reduces peak power.

Example 13: The system of example 11, wherein the fuel gauge provides the battery resistance.

Example 14: The system of example 11, wherein the power manager is to scale a difference between the system peak power and power by rest of platform, wherein the power by rest of platform is part of the system load.

Example 15: The system of example 15, wherein the power manager is to account for power conversion loss of a voltage regulator to scale the difference.

Example 16: The system of example 14, wherein the power manager is to: compare the processor peak power limit against a maximum power peak power limit; and set the processor peak power limit to the maximum processor peak power limit if the processor peak power limit is greater than the maximum power peak power limit.

Example 17: The system of example 14, wherein the power manager is to: compare the processor peak power limit against a minimum power peak power limit; and set the processor peak power limit to the minimum processor peak power limit if the processor peak power limit is less than the minimum power peak power limit.

Example 18: An apparatus comprising: a processor; and a power manager coupled to the processor to dynamically adjust a threshold voltage that determines when to throttle the processor, and to determine a peak power limit for the processor to increase performance of the processor.

Example 19: The apparatus of example 18, wherein the power manager reads battery no-load voltage and battery impedance from a battery fuel gauge to determine the threshold voltage.

Example 20: The apparatus of example 18, wherein the power manager is to: compare the peak power limit against a maximum power peak power limit; and set the peak power limit to the maximum peak power limit if the peak power limit is greater than the maximum power peak power limit.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A machine-readable storage media comprising machine-executable instructions that when executed cause one or more machines to perform a method comprising:
    calculating a current threshold voltage as a function of battery no-load voltage, maximum threshold voltage, and a voltage gap between the battery no-load voltage and a previous threshold voltage;
    calculating a processor peak power limit as part of a system peak power limit which in turn is a function of the current threshold voltage;
    sending the current threshold voltage to a threshold circuitry; and
    sending the processor peak power limit to the processor, wherein the current threshold sets a threshold voltage to trigger throttling of the processor to manage peak power of the processor.

2. The machine-readable storage media of claim 1, wherein calculating the processor peak power limit comprises:
    calculating a system peak power as a function of the current threshold voltage, battery no-load voltage, system power rail capacitance, time between system voltage drops below the current voltage threshold and the system reduces peak power, battery resistance, and a minimum voltage level of the system power rail.

3. The machine-readable storage media of claim 2, wherein calculating the processor peak power limit comprises:
    identifying a power value for non-processor loads supplied by a system supply, and scaling a difference between the system peak power and the identified power value.

4. The machine-readable storage media of claim 3, wherein scaling the difference comprises accounting for power conversion loss of a voltage regulator.

5. The machine-readable storage media of claim 1 comprising machine-executable instructions that when executed cause the one or more machines to perform the method comprising:
    comparing the processor peak power limit against a maximum power peak power limit; and
    setting the processor peak power limit to the maximum processor peak power limit if the processor peak power limit is greater than the maximum power peak power limit.

6. The machine-readable storage media of claim 5 comprising machine-executable instructions that when executed cause the one or more machines to perform the method comprising:
    comparing the processor peak power limit against a minimum power peak power limit; and
    setting the processor peak power limit to the minimum processor peak power limit if the processor peak power limit is less than the minimum power peak power limit.

7. The machine-readable storage media of claim 1, wherein processor peak power limit is an upper limit of instantaneous peak power that can be provided by a battery and capacitors of a system power rail before the processor is throttled.

8. The machine-readable storage media of claim 1 comprising machine- executable instructions that when executed cause the one or more machines to perform the method comprising:
reading the battery no-load voltage from a fuel gauge of a battery, wherein the battery no- load voltage is a runtime variable.

9. The machine-readable storage media of claim 1 comprising machine- executable instructions that when executed cause one or more machines to perform a method comprising:
lowering the current threshold voltage if it is determined that the processor is not throttling when the processor power limit crosses the peak power of the processor.

10. A system comprising:
a system load comprising a system-on-chip;
a battery having a fuel gauge to provide a battery no-load voltage;
a threshold circuitry to throttle the system-on-chip according to a threshold;
a memory to store a maximum threshold voltage, and a voltage gap between the battery no-load voltage and a previous threshold voltage;
a power manager to:
calculate a current threshold voltage as a function of the battery no-load voltage, the maximum threshold voltage, the voltage gap;
calculate a processor peak power limit as a system peak power limit which in turn is a function of the current threshold voltage;
send the current threshold voltage to the threshold circuitry; and
send the processor peak power limit to the system-on-chip, wherein the current threshold sets a threshold voltage to trigger throttling of the system load to manage peak power of the system load.

11. The system of claim 10, wherein the power manager is to calculate a system peak power as a function of the current threshold voltage, the battery no-load voltage, a system power rail capacitance, a time between system voltage drops below the current voltage threshold and the system reduces peak power, a battery resistance, and a minimum voltage level of the system power rail.

12. The system of claim 11, wherein the memory stores the system power rail capacitance, and the time between system voltage drops below the current voltage threshold and the system reduces peak power.

13. The system of claim 11, wherein the fuel gauge provides the battery resistance.

14. The system of claim 11, wherein the power manager is to scale a difference between the system peak power and power by rest of platform, wherein the power by rest of platform is part of the system load.

15. The system of claim 14, wherein the power manager is to account for power conversion loss of a voltage regulator to scale the difference.

16. The system of claim 14, wherein the power manager is to:
compare the processor peak power limit against a maximum power peak power limit; and
set the processor peak power limit to the maximum processor peak power limit if the processor peak power limit is greater than the maximum power peak power limit.

17. The system of claim 14, wherein the power manager is to:
compare the processor peak power limit against a minimum power peak power limit; and
set the processor peak power limit to the minimum processor peak power limit if the processor peak power limit is less than the minimum power peak power limit.

18. An apparatus comprising:
a processor; and
a power manager coupled to the processor to dynamically adjust a threshold voltage that determines when to throttle the processor, and to determine a peak power limit for the processor to increase performance of the processor, wherein the power manager is to dynamically adjust the threshold voltage to track a no-load voltage of a battery supplying power to the processor, wherein the power manager is to read the battery no-load voltage and a battery impedance from a battery fuel gauge to determine the threshold voltage.

19. The apparatus of claim 18, wherein the power manager is to:
compare the peak power limit against a maximum power peak power limit; and
set the peak power limit to the maximum peak power limit if the peak power limit is greater than the maximum power peak power limit.

* * * * *